United States Patent [19]
Barnes

[11] 3,777,246
[45] Dec. 4, 1973

[54] ROTARY DRIVE SYSTEMS
[75] Inventor: Anthony Michael Preston Barnes, Camberley, England
[73] Assignee: Recording Designs Limited, Camberley, England
[22] Filed: Sept. 17, 1970
[21] Appl. No.: 73,077

[30] Foreign Application Priority Data
Sept. 25, 1969 Great Britain.................. 47,157/69

[52] U.S. Cl. ............................... 318/696, 318/685
[51] Int. Cl. ........................................... H02k 37/00
[58] Field of Search.................... 318/138, 254, 696, 318/685, 439, , 227, 231; 321/9 R, DIG. 1

[56] References Cited
UNITED STATES PATENTS

| | | | |
|---|---|---|---|
| 3,406,325 | 10/1968 | Rosa | 318/227 X |
| 3,621,358 | 12/1971 | Hinrichs | 318/696 |
| 3,243,677 | 3/1966 | Cannalte et al | 318/321 X |
| 3,416,057 | 12/1968 | Froyd et al. | 318/321 X |
| 3,324,376 | 6/1967 | Hunt | 318/599 |
| 3,538,420 | 11/1970 | Klein | 318/227 X |
| 3,445,741 | 5/1969 | Gerber | 318/685 |
| 3,467,902 | 9/1969 | Shimizu et al. | 318/696 |
| 3,593,096 | 8/1969 | Newell | 317/685 |
| 3,566,239 | 2/1971 | Taniguchi | 318/685 |
| 3,443,182 | 5/1969 | Graham | 318/138 |
| 3,482,155 | 12/1969 | Fredriksen | 318/685 X |
| 3,112,433 | 11/1963 | Fairbanks | 318/696 X |
| 3,467,902 | 9/1969 | Shimizu et al. | 318/138 |

Primary Examiner—G. R. Simmons
Attorney—Fleit, Gipple & Jacobson

[57] ABSTRACT

A rotary drive system for use for example, in a transport system for a magnetic tape recorder, comprises a stepping motor adapted to be driven by the output of a function generator. The generator is arranged to generate a waveform, for example a sinusoidal waveform, composed of a plurality of contiguous voltage steps. The generator is such that, when a control means is operated to stop said motor, the generated waveform is frozen in the state obtaining at the time of said operation of the control means, so that the motor does not receive a further voltage step and stops substantially instantaneously.

2 Claims, 7 Drawing Figures

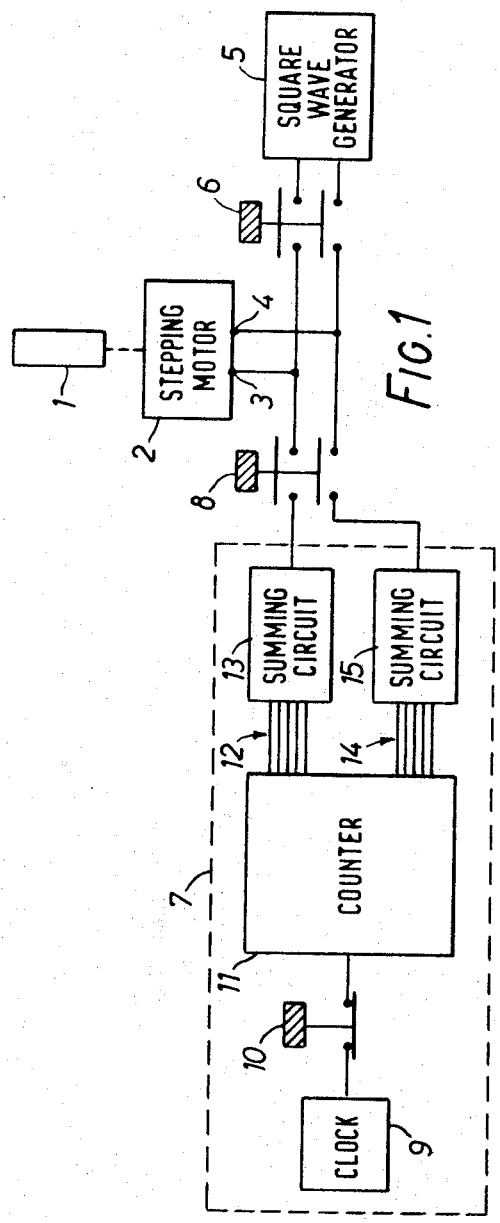
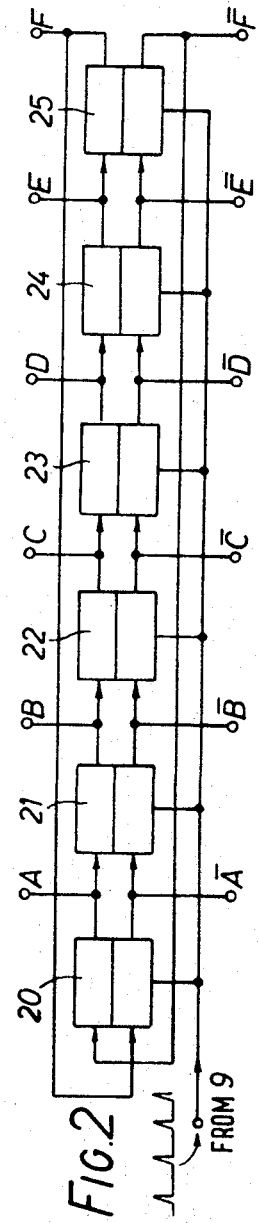
Fig. 1
Fig. 2
Inventor
Anthony M. P. Barnes

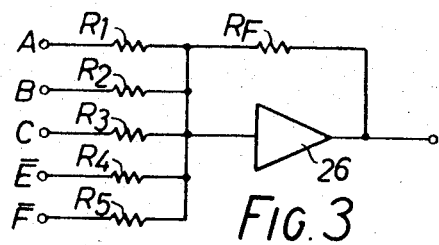
FIG.3
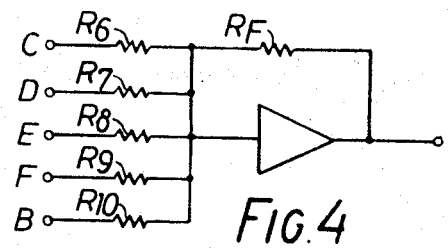
FIG.4
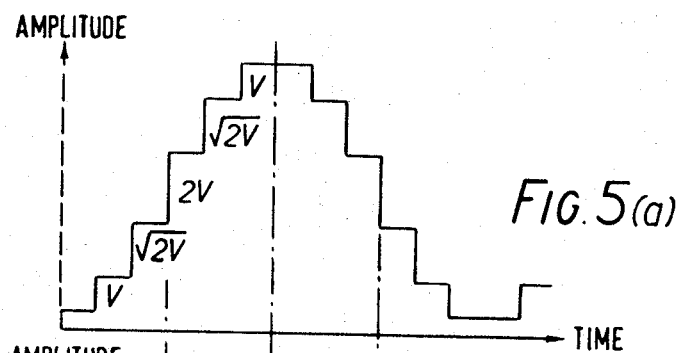
FIG.5(a)
FIG.5(b)
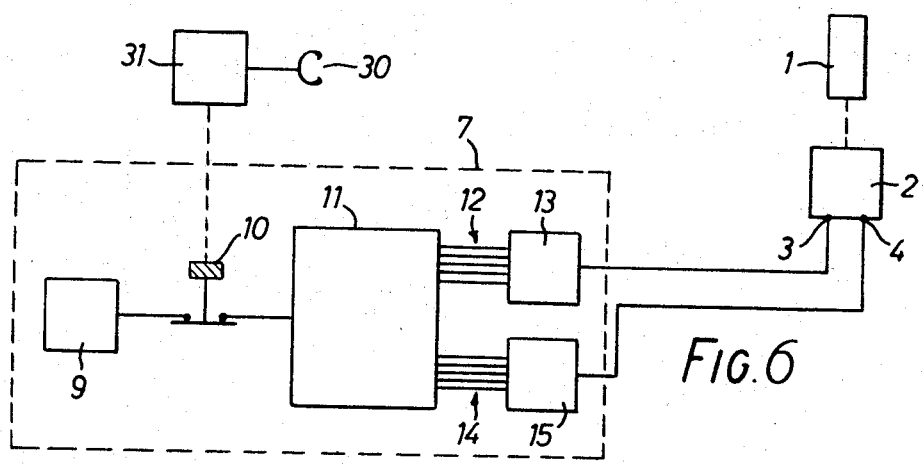
FIG.6

ROTARY DRIVE SYSTEMS

This invention relates to rotary drive systems, of the type incorporating a stepping motor, and relates especially, though not exclusively, to a tape transport system for a magnetic tape recorder.

Digital information may be recorded serially on a magnetic tape, for example by arranging that the tape is driven in steps past a magnetic head to which the information is supplied in synchronism with the stepping of the tape, a bit thereby being recorded for each step of the tape. Thus, an information word composed of $n$ bits may be recorded by $n$ steps of the tape. One way of achieving the required stepping of the tape is to use a capstan operatively coupled to the rotor of a stepping motor. The motor is fed with square wave inputs which cause the rotor to move in discrete steps.

Playback of a tape recorded in this stepped fashion is achieved by running the tape back past the magnetic head at constant speed. This may be achieved by using the stepping motor as a synchronous motor and feeding it with sine wave inputs instead of square wave inputs.

In an alternative arrangement, the stepping motor may be employed as a synchronous motor in both the record and playback modes.

If it is desired to stop the tape during playback, or during recording in the said alternative arrangement, the sine wave inputs are disconnected from the motor, for example by operation of a stop button. However, under these circumstances, the motor is free to run on until stopped by friction, and thus the tape is driven on past the desired stopping place by an indeterminate distance with the result that bits of information may be lost.

It is one object of the invention to obviate or at least greatly reduce the above drawback and provide a rotary drive system which may be stopped substantially instantaneously.

According to the invention there is provided a rotary drive system including a stepping motor having a permanent magnet rotor and a stator provided with a pair of pole pieces arranged in quadrature, each of said pole pieces being associated with a respective field coil, said system also including a source of timing pulses, switchable means for permitting or preventing the application of said pulses to a synthesizing means for generating two voltage waveforms, said synthesizing means comprising firstly, in combination, a multistage binary counter and a first summing circuit connected to receive outputs from a selected set of said stages and secondly, in combination, said counter and a second summing circuit connected to receive outputs from a different set of said stages, and said waveforms being substantially sinusoidal and in phase quadrature and each of said waveforms comprising a plurality of contiguous voltage steps of varying amplitudes, and means for applying said waveforms to respective ones of said field coils, the system being such that, when said timing pulses are applied to said synthesizing means, said rotor is synchronously rotated whereas when the application of said pulses is discontinued, said rotor stops substantially instantaneously.

A tape transport system including a rotary drive system according to the invention conveniently comprises a capstan for engaging and driving the tape, the rotor of the stepping motor being coupled to drive the capstan.

When recording information words serially on a magnetic tape, it is usual to distinguish the words from one another, to facilitate playback of words individually, by providing a start pulse before each word to indicate the beginning of the word and possibly also a terminal pulse after each word to indicate the end of the word. Preferably, therefore, a tape transport system incorporating a rotary drive system according to the present invention includes means for controlling the operation of the transport system during playback to enable the information words to be read off the tape individually as desired. Such means suitably comprises control circuits connected to receive pulses read off from the magnetic tape during playback, the circuits being adapted to recognise a start pulse preceding an information word recorded on the tape, to count the number of information pulses following the start pulse and to stop the waveform generator in the state obtaining when the number of pulses counted is equal to the number of bits contained in the information word.

Suitably, the stepping motor is a permanent magnet stepping motor havng a permanent magnet rotor and a stator provided with a pair of field coils, the waveform generator presents, at two output terminals, respective stepped sine waves which are 90° out of phase, and means are provided to connect each of the output terminals of the generator to a respective one of the field coils.

Conveniently, the stepped sine wave outputs of the waveform generator are synthesised by the addition of multiple square waveforms obtained at the outputs of bistables.

In order that the invention may be clearly understood and readily carried into effect, it will now be described with reference to the accompanying drawings, in which:

FIG. 1 illustrates schematically a tape transport system incorporating a rotary drive system according to the invention, FIG. 2 shows the counter of the system of FIG. 1 in more detail, FIG. 3 shows the first summing circuit of FIG. 1 in more detail, FIG. 4 shows the second summing circuit of FIG. 1 in more detail, FIGS. 5a and 5b show the stepped sine wave outputs obtained from the first and second summing circuits respectively, and FIG. 6 illustrates schematically another tape transport system incorporating a rotary drive system according to the invention.

Referring to FIG. 1, a tape transport system for a magnetic tape recorder comprises a capstan 1 operatively coupled to a stepping motor 2 which drives the capstan either stepwise or synchronously at substantially constant speed depending upon the input to its input terminals 3 and 4. The stepping motor 2 is of the permanent magnet type and has a toothed permanent magnet rotor, provided with a permanent South pole and a permanent North pole spaced apart by 180°. The motor 2 also includes a toothed stator provided with first and second pole pieces arranged in quadrature and associated with each of said stator pole pieces is a respective field coil. One end of each of said field coils is connected to terminal 3 and one end of the other of said field coils is connected to terminal 4; the ends of said coils remote from the respective terminals are earthed.

A first input circuit for the motor includes a square wave generator 5 adapted to produce two square waves, relatively displaced in phase by 90°, and in the record mode of the transport system, each of the square waves is fed to a respective one of the field coils. Connection between the square wave generator 5 and the motor 2 is established by a record button 6 (shown in its normal open position in the drawing).

A second input circuit for the motor 2 includes a waveform generator 7 adapted to produce two stepped sine waves, relatively displaced in phase by 90°. Each of the sine waves is fed to a respective one of the field coils in the playback mode of the transport system. Connection between the waveform generator 7 and the motor 2 is established by a playback button * (shown in its open condition in the drawing).

As shown in FIG. 1, the generator 7 includes a clock pulse generator 9 connected through a stop button 10 (shown in its normal closed position in the drawing) to a counter 11 which comprises an assembly of bistable circuits. The counter 11 has a first set 12 of five outputs connected to a first summing circuit 13 which is adapted to sum the signals on these outputs to provide at its output a first stepped sine wave. A second set 14 of five outputs of the counter 11 is connected to a second summing circuit 15 which is adapted to sum the signals on these outputs to provide a second stepped sine wave at its output which is phase displaced by 90° relative to the first stepped sine wave. The outputs of the first and second summing circuits 13 and 15 are connected through playback button 8 to inputs 3 and 4 respectively of the motor when the button 8 is operated to put the tape transport system in its playback mode.

The counter 11 is shown in more detail in FIG. 2 and comprises a group of six bistables, 20 through 25, each fed with clock pulses from generator 9. Each bistable has, in addition to its clock input, two inputs and two outputs. The bistables are connected serially, with the two outputs of each being connected to the two inputs of the following bistable, the outputs of bistables 25 being cross-connected to the inputs of bistable 20. Outputs A to F of the six bistables are identified in FIG. 2 and are employed together with their complements $\overline{A}$ to $\overline{F}$ in synthesising the two stepped sine waves as described hereinafter.

FIG. 3 illustrates in more detail the first summing circuit 13 which comprises five parallel resistors R1 - R5 connected to a feedback amplifier 26 having a feedback loop containing resistor $R_F$. Outputs A, B, C, $\overline{E}$ and $\overline{F}$ of the bistables 20 – 25 are respectively connected to resistors R1 – R5. The signals on these outputs are thus summed by the amplifier to provide a stepped waveform as shown in FIG. 5a. The contiguous voltage steps, or increments, of the stepped waveform are shown in FIG. 5a, and are respectively; V, $\sqrt{2}V$, 2V, $\sqrt{2}V$ and V, where V is the smallest voltage step. The values of resistors R1 to R5 are selected to obtain these desired steps.

As shown in FIG. 4, the second summing circuit 15 is identical to the first summing circuit, but it is fed with outputs C, D, E, F and B of the bistables 20 – 25 to produce a stepped sine wave (shown in FIG. 5b) which is of similar form to that of FIG. 5a but 90° phase displaced therefrom.

To operate the tape transport system in the playback mode, playback button 8 is depressed to connect the outputs of the two summing circuits 13 and 15 to inputs 3 and 4 of the motor.

Clock pulses, such as those shown in FIG. 2, are fed via stop button 10 to counter 11. Assuming that all of the bistables 20 to 25 are in their lower, or 0 state, it will be seen that only bistable 20 is enabled to be changed to its upper, or 1 state, by the next clock pulse, because of the cross-connection of the outputs of bistable 25. The first clock pulse thus changes bistable 20 to its 1 state, so enabling bistable 21 to be changed to its 1 state by the next clock pulse; bistable 20 remaining in its 1 state. By this means, after six clock pulses have been applied to the counter, all bistable circuits have been successively raised to their 1 states. In this condition, the output from the 1 state of bistable 25 enables bistable 20 to be changed to its 0 state by the next clock pulse (the seventh). The succeeding five clock pulses are similarly effective to change bistables 21 to 25 in succession to their 0 states. By this means, the outputs of the bistables are made to comprise six staggered square waves. By connecting the outputs A, B, C, $\overline{E}$ and $\overline{F}$ to the resistors R1 to R5 respectively of the first summing circuit 13 and the outputs C, D, E, F and B to the resistors R6 to R10 respectively of the second summing circuit 15, the square waves of these outputs can be combined in the two summing circuits 13 and 15 to produce the two stepped sine waves of FIGS. 5a and 5b, which are fed to the inputs 3 and 4 connected to the field coils of the motor. The rotor of the motor rotates at substantially constant speed in synchronism with the two stepped sine wave and the capstan therefore, drives the magnetic tape at substantially constant speed past the magnetic head.

If it is desired to stop the tape during playback, stop button 10 is depressed to disconnect the clock. The outputs of the various bistables of counter 14 are thereby left energised in the state obtaining at the time of the last clock pulse before disconnection of the clock. The rotor stops substantially instantaneously and the tape drive can be simply restarted by re-connecting the clock 9 through button 10. No information is thus lost in the stopping process. Similar considerations apply to reversal of the drive if suitable means are provided for reversing the operation of the motor.

The tape transport system of FIG. 6 is basically like that of FIG. 1 except that the stepping motor 2 in FIG. 6 is arranged to be driven synchronously in both the playback and record modes. The motor 2 is operatively coupled to drive the capstan 1 and has two input terminals 3 and 4 for receiving stepped sine waves from the generator 7. Both the record button 6 and the playback button 8 of the FIG. 1 arrangement are therefore dispensed with, and the motor 2 is directly connected to the generator 7, as shown.

When recording information words serially on a magnetic tape, it is usual to separate the words from one another to facilitate playback of individual words by providing a start pulse before each word to indicate the beginning of the word. In the system of FIG. 6, there is indicated means for controlling the operation of the system during playback to enable the information words to be read off the tape individually as desired. The control means comprises control circuits 31 connected to receive pulses read off by a magnetic head 30 from a tape driven past the head by the capstan 1. The circuits 31 include means for recognising a start pulse preceding an information word and a control counter set in operation by the start pulse recognising means, the control counter being operative to count the pulses following a start pulse and being coupled to the stop button 10 to disconnect the clock 9 when a count equal to the number of bits in an information word is achieved.

Recording is carried out by selecting the record circuits of the tape recorder and setting the stop button to its closed condition. Since the generator 7 is directly connected to the inputs 3 and 4 of the motor 2 the latter runs in synchronism with the stepped output waveforms of the generator. Digital information to be recorded is fed serially to the magnetic head 30 and is recorded in serial format along the tape as it is driven at constant speed past the head by the capstan 1, each information word being preceded by a start pulse. Should it be necessary to stop the tape during recording, this can be achieved substantially instantaneously by operating the stop button 10 to disconnect the clock 9 and thereby leave the stepped sine wave "frozen" in the state existing when the button 10 was operated. Consequently, there is substantially no overrun of the tape and no uncertainty in restarting the recording operation where it left off.

To read off information stored on a magnetic tape in the foregoing manner, the playback circuits of the tape recorded are selected and stop button 10 is closed, so that the tape is driven at constant speed past the head 30 in the same way as it was driven in the recording mode. The pulses derived from the tape by head 30 pass to the control circuits 31 which are adapted to recognise the start pulse at the beginning of the first information word and to count the subsequent pulses constituting the information word. When the number of pulses thus counted is equal to the number of bits in the information word, the control circuits actuate the stop button 10 to disconnect the clock 9 thereby stopping the tape substantially instantaneously as hereinbefore described. When it is desired to read off the next information word, either the stop button or the logic level is operated to re-connect the clock 9 so that the motor restarts and the next word is read off the tape in similar fashion to the first. In this manner, each information word can be reliably read off as a discrete unit as and when required and since there is no overrun of the motor, no information is lost.

From the foregoing it will be appreciated that the embodiment of FIG. 6 results in a simple tape transport system which functions in similar manners in both the recording and playback modes, the movement of the tape being at constant speed, even though the information words may be read off at random intervals.

Both embodiments of tape transport systems described above have the advantage that the speed of tape movement in the relevant modes, can be varied by varying the clock frequency.

What I claim is:

1. A rotary drive system including a stepping motor having a permanent magnet rotor and a stator provided with a pair of pole pieces arranged in quadrature, each of said pole pieces being associated with a respective field coil, said system also including a source of timing pulses, switchable means for permitting or preventing the application of said pulses to a synthesizing means for generating two voltage waveforms, said synthesizing means comprising firstly, in combination, a multistage binary counter and a first summing ciruit connected to receive outputs from a selected set of said stages and secondly, in combination, said counter and a second summing circuit connected to receive outputs from a different set of said stages, and said waveforms being substantially sinusoidal and in phase quadrature and each of said waveforms comprising a plurality of contiguous voltage steps of varying amplitudes, and means for applying said waveforms to respective ones of said field coils, the system being such that, when said timing pulses are applied to said synthesizing means, said rotor is synchronously rotated whereas when the application of said pulses is discontinued, said rotor stops substantially instantaneously.

2. A tape transport system incorporating a rotary drive system as claimed in claim 1 and a capstan for engaging and driving a magnetic tape, the capstan being operatively coupled to the rotor of the stepping motor, and said transport system including means for identifying a start pulse preceding an information word recorded on the tape, means for counting the number of information pulses following the start pulse and means for producing a signal to cause said switchable means to disconnect said timing pulses from said synthesizing means when the number of information pulses counted is equal to the number of bits in said information word.

* * * * *